United States Patent
Tang et al.

(10) Patent No.: US 11,624,189 B2
(45) Date of Patent: Apr. 11, 2023

(54) FULLY-ADHERED ROOF SYSTEM ADHERED AND SEAMED WITH A COMMON ADHESIVE

(71) Applicant: Holcim Technology Ltd, Zug (CH)

(72) Inventors: Jiansheng Tang, Westfield, IN (US); Michael J. Hubbard, Murfreesboro, TN (US); Joseph Kalwara, Indianapolis, IN (US); Carl E. Watkins, Jr., Mount Juliet, TN (US); Brian Alexander, Westfield, IN (US); Todd D. Taykowski, Noblesville, IN (US); Joseph R. Carr, Indianapolis, IN (US)

(73) Assignee: Holcim Technology Ltd, Zug (CH)

( * ) Notice: Subject to any disclaimer, the term of this patent is extended or adjusted under 35 U.S.C. 154(b) by 54 days.

(21) Appl. No.: 17/316,305

(22) Filed: May 10, 2021

(65) Prior Publication Data
US 2021/0262233 A1    Aug. 26, 2021

Related U.S. Application Data

(63) Continuation of application No. 16/088,171, filed as application No. PCT/US2017/024187 on Mar. 25, 2017, now abandoned.
(Continued)

(51) Int. Cl.
*E04D 5/14*    (2006.01)
*E04D 5/10*    (2006.01)
(Continued)

(52) U.S. Cl.
CPC ............... *E04D 5/148* (2013.01); *B32B 7/12* (2013.01); *B32B 25/042* (2013.01); *B32B 25/14* (2013.01);
(Continued)

(58) Field of Classification Search
CPC .. E04D 5/10; E04D 5/148; E04D 5/06; B32B 7/12; C09J 7/385
See application file for complete search history.

(56) References Cited

U.S. PATENT DOCUMENTS 3,935,353 A   1/1976   Doerfling et al.
4,032,491 A   6/1977   Schoenke
(Continued)

FOREIGN PATENT DOCUMENTS

CA   2809955 A1   5/2013
DE   19945732 A1   4/2001
(Continued)

OTHER PUBLICATIONS

Translation of WO 2006108509 A1.
(Continued)

*Primary Examiner* — Christine T Cajilig
(74) *Attorney, Agent, or Firm* — Renner, Kenner; Arthur M. Reginelli

(57) ABSTRACT

A roof system comprising a roof substrate, a first membrane including first and second opposed planar surfaces, and a second membrane including opposed first and second planar surfaces, where said second membrane is adhered to said roof substrate through an adhesive disposed on said roof-substrate contacting portion of the first membrane, and where said second membrane is adhered to said first membrane through said adhesive disposed on a lap portion of said second membrane.

18 Claims, 3 Drawing Sheets

Related U.S. Application Data

(60) Provisional application No. 62/313,196, filed on Mar. 25, 2016.

(51) Int. Cl.
   | | | |
   |---|---|---|
   | *B32B 7/12* | (2006.01) | |
   | *B32B 27/08* | (2006.01) | |
   | *B32B 27/32* | (2006.01) | |
   | *B32B 37/12* | (2006.01) | |
   | *E04D 5/06* | (2006.01) | |
   | *B32B 25/04* | (2006.01) | |
   | *B32B 25/14* | (2006.01) | |
   | *C09J 7/29* | (2018.01) | |
   | *C09J 7/40* | (2018.01) | |
   | *C09J 7/38* | (2018.01) | |

(52) U.S. Cl.
   CPC .............. *B32B 27/08* (2013.01); *B32B 27/32* (2013.01); *B32B 37/12* (2013.01); *C09J 7/29* (2018.01); *C09J 7/385* (2018.01); *C09J 7/403* (2018.01); *E04D 5/06* (2013.01); *E04D 5/10* (2013.01); *B32B 2037/1253* (2013.01); *B32B 2255/10* (2013.01); *B32B 2255/26* (2013.01); *B32B 2307/748* (2013.01); *B32B 2419/06* (2013.01); *C09J 2301/414* (2020.08); *C09J 2423/166* (2013.01); *C09J 2433/00* (2013.01)

(56) References Cited

U.S. PATENT DOCUMENTS

| | | |
|---|---|---|
| 4,404,243 A | 9/1983 | Terpay |
| 4,585,682 A | 4/1986 | Colarusso et al. |
| 4,657,958 A | 4/1987 | Fieldhouse et al. |
| 4,732,925 A | 3/1988 | Davis |
| 4,778,852 A | 10/1988 | Futamura |
| 4,786,552 A * | 11/1988 | Sasaki .................... C09J 7/20 522/182 |
| 4,806,400 A | 2/1989 | Sancaktar |
| 4,810,565 A | 3/1989 | Wasitis et al. |
| 4,908,229 A | 3/1990 | Kissel |
| 4,943,461 A | 7/1990 | Karim |
| 5,073,611 A | 12/1991 | Rehmer et al. |
| 5,086,088 A | 2/1992 | Kitano et al. |
| 5,128,386 A | 7/1992 | Rehmer et al. |
| 5,242,727 A | 9/1993 | Briddell et al. |
| 5,253,461 A | 10/1993 | Janoski et al. |
| 5,264,533 A | 11/1993 | Rehmer et al. |
| 5,317,035 A | 5/1994 | Jacoby et al. |
| 5,374,477 A | 12/1994 | Lawless et al. |
| 5,389,699 A | 2/1995 | Rehmer et al. |
| 5,389,715 A | 2/1995 | Davis et al. |
| 5,456,785 A | 10/1995 | Venable |
| 5,496,615 A | 3/1996 | Bartlett et al. |
| 5,573,092 A | 11/1996 | Gabilondo |
| 5,665,822 A | 9/1997 | Bitler et al. |
| 5,686,179 A | 11/1997 | Cotsakis |
| 5,849,133 A | 12/1998 | Senderling et al. |
| 5,880,241 A | 3/1999 | Brookhart et al. |
| 5,891,563 A | 4/1999 | Letts |
| 5,895,301 A | 4/1999 | Porter et al. |
| RE36,674 E | 4/2000 | Gluck et al. |
| 6,044,604 A | 4/2000 | Clayton et al. |
| 6,080,818 A | 6/2000 | Thakker et al. |
| 6,117,375 A | 9/2000 | Garrett et al. |
| 6,120,869 A | 9/2000 | Cotsakis et al. |
| 6,184,496 B1 | 2/2001 | Pearce |
| 6,218,493 B1 | 4/2001 | Johnson et al. |
| 6,262,144 B1 | 7/2001 | Zhao et al. |
| 6,284,360 B1 | 9/2001 | Johnson |
| 6,297,324 B1 | 10/2001 | Briddell et al. |
| 6,299,936 B1 | 10/2001 | Reck et al. |
| 6,306,460 B1 | 10/2001 | Reck et al. |
| 6,310,163 B1 | 10/2001 | Brookhart et al. |
| 6,348,530 B1 | 2/2002 | Reck et al. |
| 6,355,701 B1 | 3/2002 | Soukup et al. |
| RE37,683 E | 4/2002 | Briddell et al. |
| 6,502,360 B2 | 1/2003 | Carr, III et al. |
| 6,569,970 B2 | 5/2003 | Reck et al. |
| 6,586,080 B1 | 7/2003 | Heifetz |
| 6,605,662 B2 | 8/2003 | Zhao et al. |
| 6,641,896 B2 | 11/2003 | Fensel et al. |
| 6,683,126 B2 | 1/2004 | Keller et al. |
| 6,720,399 B2 | 4/2004 | Husemann |
| 6,753,079 B2 | 6/2004 | Husemann |
| 6,764,733 B1 | 7/2004 | Clarke |
| 6,774,071 B2 | 8/2004 | Horner, Jr. et al. |
| 6,776,322 B2 | 8/2004 | Villela et al. |
| 6,790,520 B1 | 9/2004 | Todd et al. |
| 6,794,449 B2 | 9/2004 | Fisher |
| 6,813,866 B2 | 11/2004 | Naipawer, III |
| 6,828,020 B2 | 12/2004 | Fisher et al. |
| 6,831,114 B2 | 12/2004 | Husemann |
| 6,841,608 B1 | 1/2005 | Dreher et al. |
| 6,858,315 B2 | 2/2005 | Khan et al. |
| 6,863,944 B2 | 3/2005 | Naipawer, III |
| 6,881,442 B2 | 4/2005 | Husemann |
| 6,887,917 B2 | 5/2005 | Yang et al. |
| 6,895,724 B2 | 5/2005 | Naipawer, III |
| 6,901,712 B2 | 6/2005 | Lionel |
| 7,066,371 B2 | 6/2006 | Villela et al. |
| 7,101,598 B2 | 9/2006 | Hubbard |
| 7,115,313 B2 | 10/2006 | Zanchetta et al. |
| 7,132,143 B2 | 11/2006 | Zanchetta et al. |
| 7,148,160 B2 | 12/2006 | Porter |
| 7,175,732 B2 | 2/2007 | Robison et al. |
| 7,238,732 B2 | 7/2007 | Bamborough et al. |
| 7,304,119 B2 | 12/2007 | Balzer |
| 7,323,242 B2 | 1/2008 | Gerst et al. |
| 7,358,319 B2 | 4/2008 | Balzer et al. |
| 7,368,155 B2 | 5/2008 | Larson et al. |
| 7,387,753 B2 | 6/2008 | Tackett et al. |
| 7,473,734 B2 | 1/2009 | Beckley et al. |
| 7,517,934 B2 | 4/2009 | Deeter et al. |
| 7,575,653 B2 | 8/2009 | Johnson et al. |
| 7,589,145 B2 | 9/2009 | Brant et al. |
| 7,612,120 B2 | 11/2009 | Letts |
| 7,614,194 B2 | 11/2009 | Shah |
| 7,645,829 B2 | 1/2010 | Tse et al. |
| 7,744,998 B2 | 6/2010 | Nakamuta |
| 7,771,807 B2 | 8/2010 | Hubbard |
| 7,776,417 B2 | 8/2010 | Mohseen et al. |
| 7,838,568 B2 | 11/2010 | Letts et al. |
| 7,914,868 B2 | 3/2011 | Naipawer, III et al. |
| 8,063,141 B2 | 11/2011 | Fisher |
| 8,153,220 B2 | 4/2012 | Nebesnak et al. |
| 8,202,596 B2 | 6/2012 | Yang et al. |
| 8,206,817 B2 | 6/2012 | Donovan et al. |
| 8,241,446 B2 | 8/2012 | Naipawer, III et al. |
| 8,262,833 B2 | 9/2012 | Dyal et al. |
| 8,327,594 B2 | 12/2012 | Merryman et al. |
| 8,329,800 B2 | 12/2012 | Terrenoire et al. |
| 8,381,450 B2 | 2/2013 | Cummings et al. |
| 8,389,103 B2 | 3/2013 | Kiik et al. |
| 8,399,571 B2 | 3/2013 | Becker et al. |
| 8,492,472 B2 | 7/2013 | Elizalde et al. |
| 8,530,582 B2 | 9/2013 | Becker et al. |
| 8,668,795 B2 * | 3/2014 | Tippins .................... E04D 5/12 156/289 |
| 8,852,701 B2 * | 10/2014 | Hubbard ................... E04D 5/10 428/141 |
| 10,132,082 B2 | 11/2018 | Tang et al. |
| 10,370,854 B2 | 8/2019 | Tang et al. |
| 10,519,663 B2 | 12/2019 | Tang et al. |
| 11,407,196 B2 * | 8/2022 | Solomon ................. B32B 27/32 |
| 2001/0023264 A1 | 9/2001 | Yamamoto |
| 2002/0013379 A1 | 1/2002 | Singh |
| 2003/0032351 A1 | 2/2003 | Horner, Jr. |
| 2003/0032691 A1 | 2/2003 | Bolte |
| 2003/0082365 A1 | 5/2003 | Geary |
| 2003/0082370 A1 * | 5/2003 | Husemann ................ C09J 7/385 264/514 |
| 2003/0153656 A1 | 8/2003 | Sjerps |

(56) References Cited

U.S. PATENT DOCUMENTS

| | | | |
|---|---|---|---|
| 2003/0192638 A1* | 10/2003 | Yang | B32B 7/12 |
| | | | 156/289 |
| 2003/0215594 A1 | 11/2003 | Hamdar | |
| 2004/0103608 A1 | 6/2004 | Borenstein | |
| 2004/0109983 A1 | 6/2004 | Rotter | |
| 2004/0137222 A1 | 7/2004 | Welke et al. | |
| 2004/0157074 A1* | 8/2004 | Hubbard | C09J 7/29 |
| | | | 156/719 |
| 2004/0191508 A1 | 9/2004 | Hubbard | |
| 2004/0242763 A1 | 12/2004 | Tielemans | |
| 2004/0244316 A1* | 12/2004 | Macuga | C09J 7/22 |
| | | | 52/198 |
| 2005/0097857 A1 | 5/2005 | Mehta et al. | |
| 2005/0142357 A1* | 6/2005 | Zajaczkowski | C09J 133/04 |
| | | | 526/931 |
| 2005/0214496 A1 | 9/2005 | Borenstein | |
| 2006/0017974 A1 | 1/2006 | Shapovalov et al. | |
| 2006/0052472 A1* | 3/2006 | Hansen | C09J 7/385 |
| | | | 522/35 |
| 2006/0100408 A1 | 5/2006 | Powell | |
| 2006/0127627 A1 | 6/2006 | Larson et al. | |
| 2006/0216523 A1 | 9/2006 | Takaki | |
| 2007/0054088 A1 | 3/2007 | Matijasic et al. | |
| 2007/0055032 A1* | 3/2007 | Langenbuch | B01J 19/1818 |
| | | | 526/217 |
| 2007/0095011 A1 | 5/2007 | Khan et al. | |
| 2007/0207284 A1 | 9/2007 | McClintic | |
| 2007/0281119 A1 | 12/2007 | Di Stefano | |
| 2008/0088056 A1 | 4/2008 | Vavra | |
| 2009/0053529 A1* | 2/2009 | Kenney | B32B 27/08 |
| | | | 156/243 |
| 2009/0320987 A1* | 12/2009 | Hubbard | E04B 1/665 |
| | | | 428/354 |
| 2010/0024955 A1* | 2/2010 | Kalwara | E04D 5/148 |
| | | | 428/41.3 |
| 2010/0075092 A1 | 3/2010 | Kendra et al. | |
| 2010/0086712 A1 | 4/2010 | Moller | |
| 2010/0200148 A1 | 8/2010 | Douglas | |
| 2010/0279049 A1 | 11/2010 | Hubbard | |
| 2010/0292403 A1 | 11/2010 | Ansems | |
| 2011/0048513 A1 | 3/2011 | Booth | |
| 2011/0017391 A1 | 7/2011 | Franklin et al. | |
| 2012/0240996 A1 | 9/2012 | Keiser | |
| 2013/0012287 A1 | 1/2013 | Al Ani | |
| 2013/0122287 A1 | 5/2013 | Moeller | |
| 2013/0184393 A1 | 7/2013 | Satrijo | |
| 2013/0225020 A1 | 8/2013 | Flood | |
| 2013/0316157 A1* | 11/2013 | Yang | E04D 5/148 |
| | | | 156/60 |
| 2017/0044406 A1 | 2/2017 | Hubbard et al. | |
| 2017/0058510 A1* | 3/2017 | Seabaugh | E04B 1/625 |
| 2017/0096588 A1 | 4/2017 | Demoulin et al. | |
| 2017/0114543 A1 | 4/2017 | Tang et al. | |
| 2018/0001595 A1* | 1/2018 | Seabaugh | B32B 5/022 |
| 2019/0316359 A1 | 10/2019 | Tang et al. | |

FOREIGN PATENT DOCUMENTS

| | | |
|---|---|---|
| EP | 0342811 B1 | 7/1995 |
| EP | 1548080 B1 | 6/2005 |
| EP | 2439062 A1 | 4/2012 |
| GB | 2305667 A | 4/1997 |
| JP | 2004002577 | 1/2004 |
| JP | 2004003225 | 1/2004 |
| WO | 199856866 A1 | 12/1998 |
| WO | 199924290 A1 | 5/1999 |
| WO | 2006084134 A1 | 8/2006 |
| WO | 2006108509 A1 | 10/2006 |
| WO | 2013142562 A2 | 9/2013 |
| WO | 2015042258 A1 | 3/2015 |
| WO | 2015134889 A1 | 9/2015 |
| WO | 2016130636 A1 | 8/2016 |
| WO | 2016145188 A1 | 9/2016 |
| WO | 2017049280 A1 | 3/2017 |
| WO | 2017165868 A1 | 9/2017 |
| WO | 2017165870 A1 | 9/2017 |
| WO | 2017165871 A1 | 9/2017 |

OTHER PUBLICATIONS

Translation of JP 2004003225.
Translation of JP 2004002577.
Translation of EP 1548080 B1.
Translation of EP 2439062 A1.
European Standard EN 13956:2012.
Technical Datasheet of RoofSea/OneStep tape.
Technical Datasheet of Sika Samafil G410 SA Flashing Membrane.

* cited by examiner

FULLY-ADHERED ROOF SYSTEM ADHERED AND SEAMED WITH A COMMON ADHESIVE

This application is a continuation application of U.S. Non-Provisional application Ser. No. 16/088,171 filed on Sep. 25, 2018, which is a U.S. National-Stage Application of PCT/US2017/024187 filed on Mar. 25, 2017, which claims the benefit of U.S. Provisional Application Ser. No. 62/313,198, filed on Mar. 25, 2016, which are incorporated herein by reference.

FIELD OF THE INVENTION

Embodiments of the present invention include fully-adhered roof systems including membranes secured to a roof surface through a factory-applied adhesive and seamed to each other through the same factory-applied adhesive.

BACKGROUND OF THE INVENTION

Large, flexible polymeric sheets, which are often referred to as membranes or panels, are used in the construction industry to cover flat or low-sloped roofs. These membranes provide protection from the environment particularly in the form of a waterproof barrier. As is known in the art, commercially popular membranes include thermoset membranes such as those including cured EPDM (i.e. ethylene-propylene-diene terpolymer rubber) or thermoplastics such as TPO (i.e. thermoplastic olefins).

These membranes are typically delivered to a construction site in a bundled roll, transferred to the roof, and then unrolled and positioned over the roof surface. The sheets are then secured to the building structure by employing varying techniques such as mechanical fastening, ballasting, and/or adhesively adhering the membrane to the roof. The roof substrate to which the membrane is secured may be one of a variety of materials depending on the installation site and structural concerns. For example, the surface may be a concrete, metal, or wood deck, it may include insulation or recover board, and/or it may include an existing membrane.

In addition to securing the membrane to the roof—which mode of attachment primarily seeks to prevent wind uplift—the individual membrane panels, together with flashing and other accessories, are positioned and adjoined to achieve a waterproof barrier on the roof. Typically, the edges of adjoining panels are overlapped, and these overlapped portions are adjoined to one another through a number of methods depending upon the membrane materials and exterior conditions. For example, a seam can be prepared by applying a liquid adhesive or a solid tape. Or, where the membranes are thermoplastic, a seam can be formed by heat welding adjacent overlapping membranes.

Where the membranes are adhesively secured to a roof substrate, several modes of adhesive attachment are known. One attractive mode includes the use of a pre-applied (i.e. factory-applied) adhesive that is applied to the surface of the membrane. These membranes, which are commonly referred to as peel-and-stick membranes, may employ a variety of adhesive compositions, including those applied as a hot melt, including styrene-ethylene-butylene-styrene (SEBS), butyl-based adhesives, EPDM-based adhesives, acrylic adhesives, styrene-butadiene adhesives, polyisobutylene adhesives, and ethylene vinyl acetate adhesives.

In view of the nature of the adhesives that have been employed in peel-and-stick membranes, the roofing systems constructed of these membranes have inherent limitations. Specifically, there are temperature windows that limit the minimum temperature at which the membranes can be installed on a roof surface. Also, there are maximum temperature limits on the roof surface that the adhesive can withstand while maintaining wind-uplift resistance. With respect to the latter, where the surface temperature on the roof nears the glass transition temperature of the adhesive, the adhesive strength offered by the pressure-sensitive adhesive is not maintained. As a result, peel-and-stick membranes have not gained wide acceptance in the industry. Moreover, the use of peel-and-stick membranes has been limited to use in conjunction with white or highly reflective membranes (e.g., white thermoplastic membranes) because the surface temperature of these membranes remains cooler when exposed to solar energy.

While peel-and-stick membranes have been used commercially (with limited acceptance), attempts to use the factory-applied adhesive for seaming adjacent membranes has been problematic. The seams between membranes are subjected to conditions not typically present under the membrane (i.e. where the membrane is attached to the underlying substrate), and it is believed that these factors lead to the failure of seams formed using the same pressure-sensitive adhesives used to secure the membrane to the roof surface. For example, as disclosed in U.S. Publ. No. 2004/0191508, it is believed that temperature swings and moisture contributes to the premature failure of these seams. As a result, thermoplastic peel-and-stick membranes are often manufactured with an "open" lap edge (i.e. a lap without an adhesive layer) so that the seams of these thermoplastic membranes can be heat welded. Alternatively, as disclosed in U.S. Publ. No. 2010/0024955, adhesive tapes (such as butyl-based adhesive tapes) are applied along the lap edge in lieu of the pressure-sensitive adhesive applied to the remainder of the membrane. It has also been proposed, although with limited success, to factory prime the upper surface of the adjoining membrane in an attempt to improve the seam.

SUMMARY OF THE INVENTION

One or more embodiments of the present invention provide a roof system comprising (i) a roof substrate, (ii) a first membrane including first and second opposed planar surfaces, where the first planar surface includes a roof-substrate contacting portion and a lap portion, said membrane having disposed on said roof-substrate contacting portion and said lap portion a UV-cured adhesive, where said first membrane is adhered to said roof substrate through said adhesive disposed on said roof-substrate contacting portion, and (iii) a second membrane including opposed first and second planar surfaces, where the first planar surface includes a roof-substrate contacting portion and a lap portion, said membrane having disposed on said roof-substrate contacting portion and said lap portion a UV-cured adhesive, where said second membrane is adhered to said roof substrate through said adhesive disposed on said roof-substrate contacting portion, and where said second membrane is adhered to said first membrane through said adhesive disposed on said lap portion of said second membrane.

Yet other embodiments of the present invention provide a method of installing a roof system, the method comprising (i) providing a membrane composite including a polymeric planar body having first and second opposed planar surfaces, a UV-cured adhesive layer disposed on the first planar surface, and a release member removably affixed to the adhesive layer; (ii) adhesively securing said membrane composite to a roof surface through the UV-cured adhesive;

(iii) providing a second membrane composite including a polymeric planar body having first and second planar surfaces, a UV-cured adhesive layer disposed on the first planar surface thereof, and a release member removable fixed to the adhesive layer; (iv) adhesively securing the second membrane composite to the roof surface through the UV-cured adhesive, where the second membrane composite in positioned adjacent to and partially overlapping the first membrane composite so as to form a seam area; and (v) adhesively securing the second membrane composite to the second planar surface of the first membrane composite within said lap area through said UV-cured adhesive disposed on the second membrane composite.

Still yet other embodiments of the present invention provide a membrane composite comprising (i) a membrane panel having opposed first and second planar surfaces, said first planar surface including a roof-substrate contacting portion and a lap portion, (ii) a UV-cured adhesive disposed on said roof-substrate contacting portion and said lap portion; and (iii) a release member removable affixed to said UV-cured adhesive in both said roof-substrate contacting portion and said lap portion.

DETAILED DESCRIPTION OF ILLUSTRATIVE EMBODIMENTS

Embodiments of the invention are based, at least in part, on the discovery of a roof system wherein a single-ply membrane is adhered to a roof substrate through a factory-applied adhesive layer, and adjoining membranes are seamed to each other through the same factory-applied adhesive layer. According to aspects of the invention, the factory-applied adhesive layer includes a cross-linked adhesive that is applied to the membrane as a hot melt. Advantageously, in one or more embodiments, the adhesive employed to secure the membrane to the roof, which is the same adhesive used to seam adjacent membranes, is substantially consistent throughout the adhesive layer, particularly with regard to similarity and composition, thickness, and cure state. While the prior art contemplates the use of factory-applied adhesive layers that can both adhere the membrane to the roof and seam adjoining membranes, it has unexpectedly been discovered that the adhesive employed in the present invention can form a seam that does not suffer from the shortcomings of prior art systems.

Membrane Composite

Figure 1:
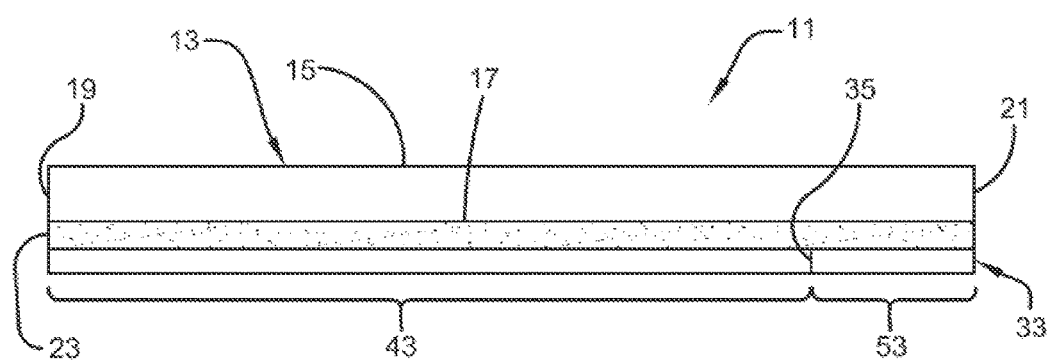
FIG. 1 is a cross-sectional side view of a roofing composite employed in the practice of the present invention.

A membrane composite according to embodiments of the present invention can be described with reference to FIG. 1, which shows membrane composite 11 including polymeric planar body 13, adhesive layer 23, and release member 33. Planar body 13 includes top planar surface 15, bottom planar surface 17, first lateral edge 19, and second lateral edge 21. Adhesive layer 23, which is a pressure sensitive adhesive, is disposed on bottom planar surface 17 and extends the entire width of planar body 13 from first lateral edge 19 to second lateral edge 21. Release member 33 covers adhesive layer 23 on a surface thereof opposite planar body 13. In particular embodiments, release member 33 includes perforation 35, which allows release member 33 to be removed in segments in order to separately expose roof-surface contacting portion 43 and lap area portion 53 of layer 23. Alternatively, the same functionality can be achieved by employing two separate release members, one removably affixed to roof-surface contacting portion 43 and the other attached to lap area portion 53.

Roof System

Figure 2:
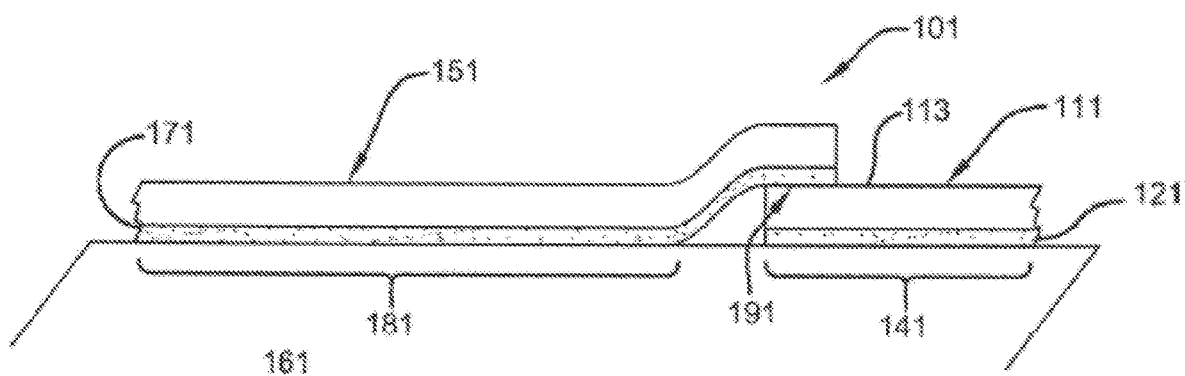
FIG. 2 is a cross-sectional side view of a roof system according to embodiments of the present invention.

A roof system according to embodiments of the present invention can be described with reference to FIG. 2, which shows roof system 101 including first membrane composite 111 and second membrane composite 151, which are both adhesively secured to roof substrate 161. Specifically, membrane composite 111 is adhesively secured to substrate 161 through adhesive layer 121 along a roof-surface contacting region 141. And, membrane composite 151 is secured to roof substrate 161 through adhesive layer 171 along a roof-substrate contacting region 181. Additionally, adhesive layer 171 of composite membrane 151 is adhesively mated to membrane composite 111, on an upper surface 113 thereof, to form a lap seam 191.

UV-Curable Hot-Melt Pressure-Sensitive Adhesive

In one or more embodiments, the pressure-sensitive adhesive layer (e.g. layer 23) is a cured pressure-sensitive adhesive. In sub-embodiments thereof, this cured pressure-sensitive adhesive layer is formed from a curable hot-melt adhesive. In other words, and as will be described in greater detail below, an uncured adhesive composition is applied to the membrane as a hot-melt composition (i.e. the composition is heated and applied as a flowable composition in the absence or appreciable absence of solvent), and then the composition is subsequently crosslinked (i.e. cured) to form the cured pressure-sensitive layer.

In one or more embodiments, the cured pressure-sensitive adhesive layer may be an acrylic-based hot-melt adhesive. In one or more embodiments, the adhesive is a polyacrylate such as a polyacrylate elastomer. In one or more embodiments, useful polyacrylates include one or more units defined by the formula:

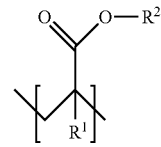

where each $R^1$ is individually hydrogen or a hydrocarbyl group and each $R^2$ is individually a hydrocarbyl group. In the case of a homopolymer, each $R^1$ and $R^2$, respectively, throughout the polymer are same in each unit. In the case of a copolymer, at least two different $R^1$ and/or two different $R^2$ are present in the polymer chain.

In one or more embodiments, hydrocarbyl groups include, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms. In particular embodiments, each $R^2$ is an alkyl group having at least 4 carbon atoms. In particular embodiments, $R^1$ is hydrogen and $R^2$ is selected from the group consisting of butyl, 2-ethylhexyl, and mixtures thereof.

In one or more embodiments, the polyacrylate elastomers that are useful as adhesives in the practice of this invention may be characterized by a glass transition temperature (Tg) of less than 0° C., in other embodiments less than −20° C., in other embodiments less than −30° C. In these or other embodiments, useful polyacrylates may be characterized by a Tg of from about −70 to about 0° C., in other embodiments from about −50 to about −10° C., and in other embodiments from about −40 to about −20° C.

In one or more embodiments, the polyacrylate elastomers that are useful as adhesives in the practice of this invention may be characterized by a number average molecular weight of from about 90 to about 800 kg/mole, in other embodiments from about 100 to about 350 kg/mole, in other embodiments from about 100 to about 700 kg/mole, in other embodiments from about 150 to about 270 kg/mole, in other embodiments from about 120 to about 600 kg/mole, and in other embodiments from about 180 to about 250 kg/mole.

In one or more embodiments, the polyacrylate elastomers that are useful as adhesives in the practice of this invention may be characterized by a Brookfield viscosity at 150° C. of from about 10,000 to about 200,000 cps, in other embodiments from about 30,000 to about 60,000 cps, in other embodiments from about 30,000 to about 170,000 cps, in other embodiments from about 25,000 to about 150,000 cps, in other embodiments from about 30,000 to about 60,000 cps, and in other embodiments from about 40,000 to about 50,000 cps.

Specific examples of polyacrylate elastomers that are useful as adhesives in the practice of the present invention include poly(butylacrylate), and poly(2-ethylhexylacrylate). These polyacrylate elastomers may be formulated with photoinitiators, solvents, plasticizers, and resins such as natural and hydrocarbon resins. The skilled person can readily formulate a desirable adhesive composition. Useful adhesive compositions are disclosed, for example, in U.S. Pat. Nos. 6,720,399, 6,753,079, 6,831,114, 6,881,442, and 6,887,917, which are incorporated herein by reference.

In other embodiments, the polyacrylate elastomers may include polymerized units that serve as photoinitiators. These units may derive from copolymerizable photoinitiators including acetophenone or benzophenone derivatives. These polyacrylate elastomers and the adhesive compositions formed therefrom are known as disclosed in U.S. Pat. Nos. 7,304,119 and 7,358,319, which are incorporated herein by reference.

Useful adhesive compositions are commercially available in the art. For example, useful adhesives include those available under the tradename acResin (BASF), those available under the tradename AroCure (Ashland Chemical), and NovaMeltRC (NovaMelt). In one or more embodiments, these hot-melt adhesives may be cured (i.e., crosslinked) by UV light.

In one or more embodiments, the hot-melt adhesive is at least partially cured after being applied to the membrane, as will be discussed in greater detail below. In one or more embodiments, the adhesive is cured to an extent that it is not thermally processable in the form it was prior to cure. In these or other embodiments, the cured adhesive is characterized by a cross-linked infinite polymer network. While at least partially cured, the adhesive layer of one or more embodiments is essentially free of curative residue such as sulfur or sulfur crosslinks and/or phenolic compounds or phenolic-residue crosslinks.

In one or more embodiments, the degree of cure throughout the adhesive layer (i.e., adhesive layer 23 from first lateral edge 19 to second lateral edge 21) has a substantially consistent degree of cure. In one or more embodiments, the degree of cure throughout the entire adhesive layer varies by no more than 10%, in other embodiments by no more than 5%, and in other embodiments by no more than 1%. In one or more embodiments, the degree of cure is substantially consistent, which refers to an unappreciable variation in the cure state. In one or more embodiments, the cure state of the entire adhesive layer, which for example runs from first lateral edge 19 to second lateral edge 21, can be quantified based upon gel content. As a skilled person appreciates, gel content can be determined based upon the level of insoluble material following solvent extraction, which for purposes of this specification refers to solvent extraction using THF at its boiling point following four hours of extraction. These extraction techniques can be performed, for example, using Soxhlet extraction devices. In one or more embodiments, the gel content of the cured adhesive layer, based upon a THF extraction at the boiling point of THF after four hours, is at least 50%, in other embodiments at least 55%, and in other embodiments at least 60% by weight. In these or other embodiments, the gel content is less than 90%, in other embodiments less than 85%, and in other embodiments less than 80%. In one or more embodiments, the gel content is from about 50% to about 90%, in other embodiments from about 55% to about 85%, and in other embodiments from about 60% to about 80% by weight.

As indicated above, the pressure-sensitive adhesive, in its cured stated, provides sufficient tack to allow the membrane composites of this invention to be used in roofing systems that meet industry standards for wind uplift resistance. In one or more embodiments, this tack may be quantified based upon the peel strength when adhered to another membrane in accordance with ASTM D-1876-08. In one or more embodiments, the cured pressure-sensitive adhesive of the present invention is characterized by a peel strength, according to ASTM D-1876-08, of at least 1.8 lbf/in, in other embodiments at least 3.6 lbf/in, in other embodiments at least 8.0 lbf/in, in other embodiments at least 15 lbf/in, and in other embodiments at least 20 lbf/in.

Similarly, the tack of the pressure-sensitive adhesive, in its cured state, may be quantified based upon the peel strength when adhered to a construction board (e.g. insulation board) having a kraft paper facer in accordance with ASTM D-903-98 (2010). In one or more embodiments, the cured pressure-sensitive adhesive of the present invention is characterized by a peel strength, according to ASTM D-903-98 (2010) using an insulation board with kraft paper facer, of at least 1.5 lbf/in, in other embodiments at least 2.0 lbf/in, in other embodiments at least 2.5 lbf/in, in other embodiments at least 3.0 lbf/in, and in other embodiments at least 3.5 lbf/in.

Release Member

In one or more embodiments, the release member (e.g. release member 33), which may also be referred to as a release liner or release paper, may include a polymeric film or extrudate, or in other embodiments it may include a cellulosic substrate. In one or more embodiments, the polymeric film and/or cellulosic substrate can carry a coating or layer that allows the polymeric film and/or cellulosic substrate to be readily removed from the adhesive layer after attachment. This polymeric film or extrudate may include a single polymeric layer or may include two or more polymeric layers laminated or coextruded to one another.

Suitable materials for forming a release member that is a polymeric film or extrudate include polypropylene, polyester, high-density polyethylene, medium-density polyethylene, low-density polyethylene, polystyrene or high-impact polystyrene. The coating or layer applied to the film and/or cellulosic substrate may include a silicon-containing or fluorine-containing coating. For example, a silicone oil or polysiloxane may be applied as a coating. In other embodiments, hydrocarbon waxes may be applied as a coating. As the skilled person will appreciate, the coating, which may be referred to as a release coating, can be applied to both planar surfaces of the film and/or cellulosic substrate. In other embodiments, the release coating need only be applied to the planar surface of the film and/or cellulosic substrate that is ultimately removably mated with the adhesive layer.

In one or more embodiments, the release member is characterized by a thickness of from about 15 to about 80 µm, in other embodiments from about 18 to about 75 µm, and in other embodiments from about 20 to about 50 µm.

Thickness of Adhesive Layer

In one or more embodiments, the thickness of the pressure-sensitive adhesive layer (e.g. layer 23) may be at least 15 µm, in other embodiments at least 30 µm, in other embodiments at least 45 µm, and in other embodiments at least 60 µm. In these or other embodiments, the thickness of the pressure-sensitive adhesive layer may be at most 1000 µm, in other embodiments at most 600 µm, in other embodiments at most 300 µm, in other embodiments at most 150 µm, and in other embodiments at most 75 µm. In one or more embodiments, the thickness of the pressure-sensitive adhesive layer may be from about 15 µm to about 600 µm, in other embodiments from about 15 µm to about 1000 µm, in other embodiments from about 30 µm to about 300 µm, and in other embodiments from about 45 µm to about 150 µm.

Membrane Panel

In one or more embodiments, the membrane, which may be referred to as a panel (e.g. panel 21) may be a thermoset material. In other embodiments the membrane may be a thermoformable material. In one or more embodiments, the membrane may be EPDM based. In other embodiments, the membrane may be TPO based. In these or other embodiments, the membrane may be flexible and capable of being rolled up for shipment. In these or other embodiments, the membrane may include fiber reinforcement, such as a scrim. In one or more embodiments, the membrane includes EPDM membranes including those that meet the specifications of the ASTM D-4637. In other embodiments, the membrane includes thermoplastic membranes including those that meet the specifications of ASTM D-6878-03. Still other membranes may include PVC, TPV, CSPE, and asphalt-based membranes.

In one or more embodiments, the roofing membrane panels are characterized by conventional dimensions. For example, in one or more embodiments, the membrane panels may have a thickness of from about 500 µm to about 3 mm, in other embodiments from about 1,000 µm to about 2.5 mm, and in other embodiments from about 1,500 µm to about 2 mm. In these or other embodiments, the membrane panels of the present invention are characterized by a width of about 1 m to about 20 m, in other embodiments from about 2 m to about 18 m, and in other embodiments from about 3 m to about 15 m.

Roof Substrate

Practice of the present invention is not necessarily limited by the selection of any particular roof substrate to which the membranes can be attached in forming the roof systems of the present invention. In one or more embodiments, the roof substrate may include the roof deck. In other embodiments, the roof substrate may include an intervening construction layer disposed above the roof deck. As the skilled person will appreciate, these intervening layers may include, but are not limited to, insulation boards, cover boards, underlayment, and existing membranes.

Preparation of Membrane Composite

The membrane panels employed in the membrane composites of the present invention may be prepared by conventional techniques. For example, thermoplastic membrane panels may be formed by the extrusion of thermoplastic compositions into one or more layers that can be laminated into a membrane panel. Thermoset membranes can be formed using known calendering and curing techniques. Alternatively, thermoset membranes can be made by continuous process such as those disclosed in WO 2013/142562, which is incorporated herein by reference.

Once the membrane is formed, the curable hot-melt adhesive can be extruded onto the membrane by using known apparatus such as adhesive coaters. The adhesive can then subsequently be cured by using, for example, UV radiation. The release film can be applied to the adhesive layer, and the membrane can then be subsequently rolled for storage and/or shipment. Advantageously, where the membrane panel is made by using continuous techniques, the process can be supplemented with continuous techniques for applying and curing the adhesive coatings according to embodiments of the present invention to thereby prepare usable membrane composites within a single continuous process.

Figure 3:
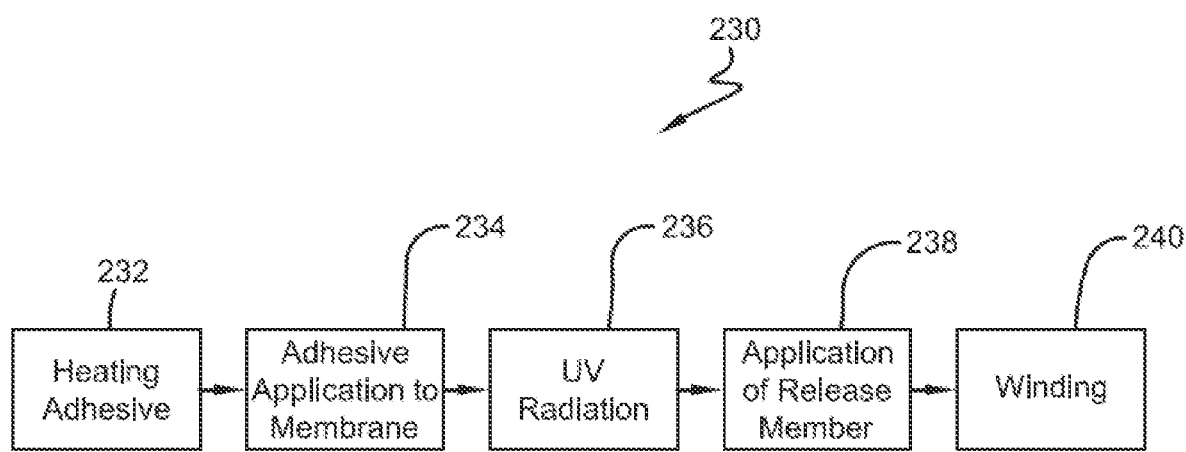
FIG. 3 is a flow chart describing a process for making membrane composite according to embodiments of the present invention.

As generally shown in FIG. 3, process 230 for preparing a composite membrane according to the present invention generally begins with a step of heating 232, wherein a pressure-sensitive adhesive is heated to a sufficient temperature to allow the adhesive to be applied as a coating within a coating step 234. Within coating step 234, the adhesive is applied to the membrane to form a coating layer. Following formation of the coating, the coating is subjected to a UV-curing step 236 where sufficient UV energy is applied to the coating to thereby effect a desirable curing or crosslinking of the adhesive. Once the adhesive has been sufficiently cured by exposure to UV curing step 236, a release member can be applied to the cured coating in a member application step 238. Following application of a member, the composite is wound into a roll at winding step 240.

In one or more embodiments, heating step 232 heats the adhesive to a temperature of from about 120 to about 160° C., in other embodiments from about 125 to about 155° C., and in other embodiments from about 130 to about 150° C.

In one or more embodiments, adhesive step 234 applies an adhesive to the surface of a membrane to form an adhesive layer of adhesive that has a thickness of at least 51 µm (2 mil), in other embodiments at least 102 µm (4 mil), in other embodiments at least 127 µm (5 mil), and in other embodiments at least 152 µm (6 mil). In one or more embodiments, adhesive step 234 applies an adhesive to the surface of a membrane to form a adhesive layer of adhesive that has a thickness of from about 51 to about 381 µm (about 2 to about 15 mil), in other embodiments from about 102 to about 305 µm (about 4 to about 12 mil), and in other embodiments from about 127 to about 254 µm (about 5 to about 10 mil). In one or more embodiments, the adhesive has a uniform thickness such that the thickness of the adhesive at any given point on the surface of the membrane does not vary by more than 51 μm (2 mil), in other embodiments by more than 38 μm (1.5 mil), and in other embodiments by more than 25 μm (1 mil).

In one or more embodiments, UV curing step 236 subjects the adhesive to a UV dosage of from about 30 to about 380 millijoule/cm$^2$, in other embodiments from about 35 to about 300 millijoule/cm$^2$, in other embodiments from about 40 to about 280 millijoule/cm$^2$, in other embodiments from about 45 to about 240 millijoule/cm$^2$, and in other embodiments from about 48 to about 235 millijoule/cm$^2$. It has advantageously been discovered that the required dosage of energy can be exceeded without having a deleterious impact on the adhesives of the present invention. For example, up to ten times, in other embodiments up to five times, and in other embodiments up to three times the required dosage can be applied to the adhesive composition without having a deleterious impact on the adhesive composition and/or its use in the present invention.

In one or more embodiments, UV curing step 236 subjects the adhesive to a UV intensity, which may also be referred to as UV irradiance, of at least 150 milliWatts/cm$^2$, in other embodiments at least 200, and in other embodiments at least 250 milliWatts/cm$^2$. In these or other embodiments, UV curing step 36 subjects the adhesive to a UV intensity of from about 150 to about 500 milliWatts/cm$^2$, in other embodiments from about 200 to about 400 milliWatts/cm$^2$, and in other embodiments from about 250 to about 350 milliWatts/cm$^2$. It has advantageously been discovered that the ability to appropriately cure the adhesive compositions of the present invention, and thereby provide a useful pressure-sensitive adhesive for the roofing applications disclosed herein, critically relies on the UV intensity applied to the adhesive. It is believed that the thickness of the adhesives (and therefore the thickness of the pressure-sensitive adhesive layer) employed in the present invention necessitates the application of greater UV intensity.

In one or more embodiments, the energy supplied to the adhesive layer within UV radiation step 236 is in the form of UV-C electromagnetic radiation, which can be characterized by a wave length of from about 250 to about 260 nm. In one or more embodiments, the UV dosage applied during UV curing step 236 is regulated based upon a UV measuring and control system that operates in conjunction with UV curing step 236. According to this system, UV measurements are taken proximate to the surface of the adhesive layer using known equipment such as a UV radiometer. The data from these measurements can be automatically inputted into a central processing system that can process the information relative to desired dosage and/or cure states and automatically send signal to various variable-control systems that can manipulate one or more process parameters. For example, the power supplied to the UV lamps and/or the height at which the UV lamps are positioned above the adhesive layer can be manipulated automatically based upon electronic signal from the central processing unit. In other words, the UV intensity, and therefore the UV dosage, can be adjusted in real time during the manufacturing process.

In one or more embodiments, an exemplary process for preparing the membrane composites of the present invention can be described with reference to FIG. 4. Continuous process 250 includes a heating step 252 where UV curable hot-melt adhesive 251 is heated to a desired temperature within a heated tank 253. Adhesive 251 is fed into an extrusion device, such as a coater 255, which may include a pump, such as a gear pump 257, and a slot die 259. Within coating step 254, coater 255 extrudes adhesive 251, which is in its molten, liquid or flowable state, and deposits a coating layer 261 of adhesive 251 onto a planar surface 263 of membrane 265.

Figure 4:
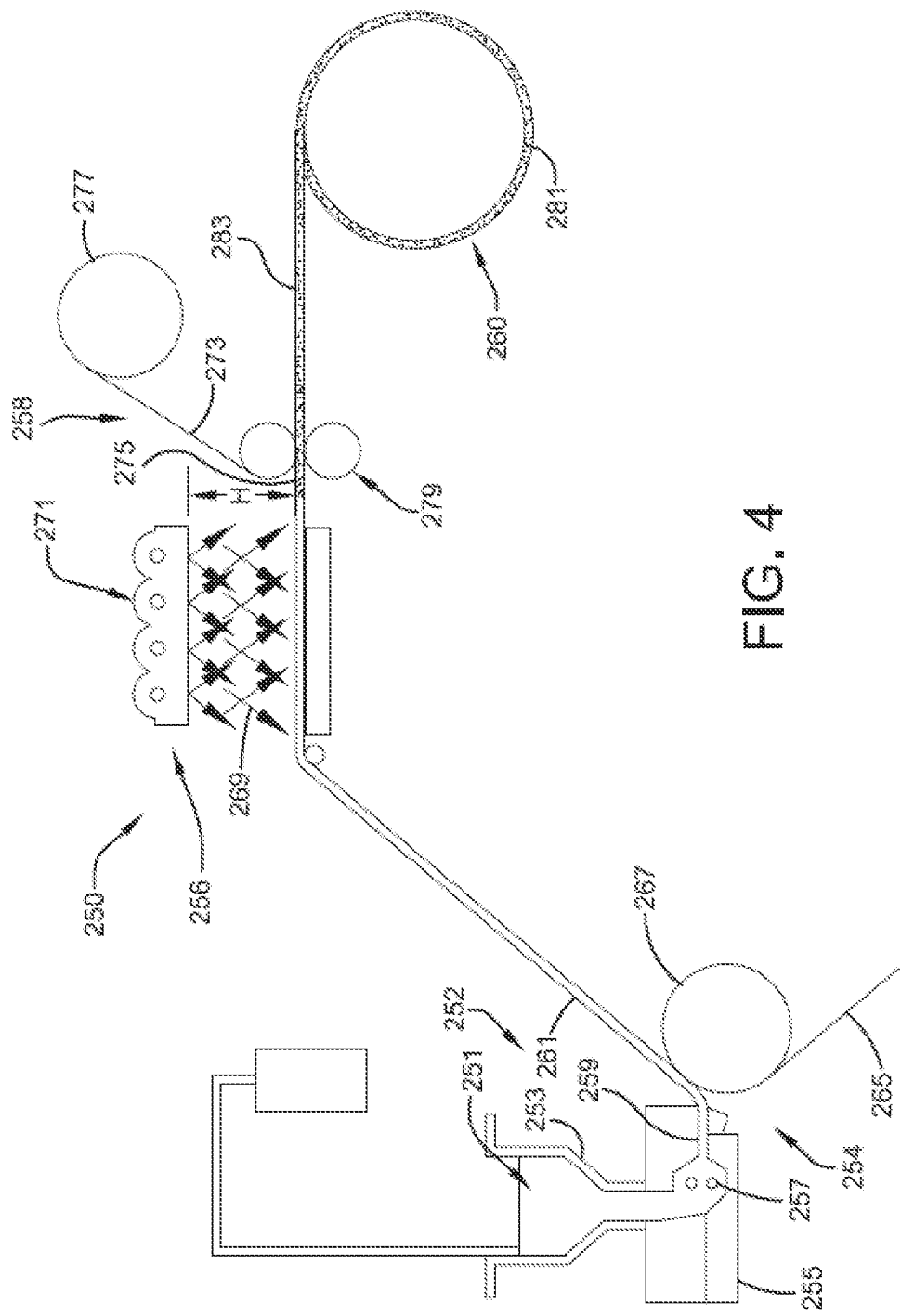
FIG. 4 is a schematic of a continuous process for making membrane composite according to the present invention.

As shown in FIG. 4, coating step 254 can include a roll-coating operation, where adhesive 251 is applied to membrane 265 while membrane 265 is at least partially wound around a coating mandrel 267. Membrane 265 carrying coating layer 261 is fed to a crosslinking step 256, where coating layer 261 of adhesive 251 is subjected to a desired dosage of UV radiation 269, which may be supplied by one or more UV lamps 271. UV lamps 271 may include, for example, mercury-type UV lamps or LED UV lamps. As the skilled person appreciates, the desired dosage of UV energy can be supplied to coating 261 by adjusting the UV intensity and exposure time. The intensity can be manipulated by the power supplied to the respective lamps and the height (H) that the lamps are placed above the surface of coating 261 of adhesive 251. Exposure time can be manipulated based upon the line speed (i.e., the speed at which membrane 265 carrying coating layer 261 is passed through UV curing step 256).

Following UV curing step 256, release member 273 may be applied to upper surface 275 of coating layer 261 within release member application step 258. As shown in FIG. 4, release member 273 may be supplied from a mandrel 277 and removably mated to upper surface 275 through pressure supplied by nip rolls 279. After application of release member 273, the composite product may be wound within winding step 260 to provide wound rolls 281 of composite products 283.

Advantageous Characteristics of Seam

As suggested above, practice of the present invention provides a lap seam, using the factory-applied pressure-sensitive adhesive described herein, as the sole adhesive, that advantageously outperforms seams prepared using the factory-applied pressure-sensitive adhesives of the prior art. For example, where the factory-applied pressure-sensitive adhesive is solely employed to seam thermoplastic polyolefin membranes (TPO membranes), the seam can achieve a peel strength, per ASTM D-413, of at least 1.5, in other embodiments at least 1.6, and in other embodiments at least 1.7 pounds per lineal inch (pli) at 72° C. without the use of a primer. Likewise, similar seams can achieve a peel strength, per ASTM D-413, of at least 3.6, in other embodiments at least 3.7, and in other embodiments at least 3.9 pounds per lineal inch (pli) at 120° C. without the use of a primer. And, similar seams can achieve a peel strength, per ASTM D-413, of at least 0.5, in other embodiments at least 0.6, and in other embodiments at least 0.7 pounds per lineal inch (pli) at 158° C. without the use of a primer.

In these or other embodiments, where the factory-applied pressure-sensitive adhesive is solely employed to seam thermoplastic polyolefin membranes (TPO membranes) and the contact surface is primed (i.e. the upper surface of the adjoining membrane), the seam can achieve a peel strength, per ASTM D-413, of at least 3.0, in other embodiments at least 3.1, and in other embodiments at least 3.3 pounds per lineal inch (pli) at 72° C. Likewise, similar seams can achieve a peel strength, per ASTM D-413, of at least 2.2, in other embodiments at least 2.8, and in other embodiments at least 3.0 pounds per lineal inch (pli) at 220° C. when the adjoining surface is primed. And, similar seams can achieve a peel strength, per ASTM D-413, of at least 0.5, in other embodiments at least 0.6, and in other embodiments at least 0.7 pounds per lineal inch (pli) at 158° C. when the adjoining surface is primed.

Also, where the factory-applied pressure-sensitive adhesive is solely employed to seam thermoplastic polyolefin membranes (TPO membranes), the seam can achieve an adhesive shear strength, per PTR 10247 (ASTM D-413), of at least 20, in other embodiments at least 22, and in other embodiments at least 25 pounds per square inch (psi) at 72° C. without the use of a primer. Likewise, similar seams can achieve a peel strength, of at least 11, in other embodiments at least 12, and in other embodiments at least 13 pounds per square inch (psi) at 120° C. without the use of a primer. And, similar seams can achieve a peel strength, of at least 6, in other embodiments at least 7, and in other embodiments at least 8 pounds per square inch (psi) at 158° C. without the use of a primer.

In these or other embodiments, where the factory-applied pressure-sensitive adhesive is employed to seam thermoplastic polyolefin membranes (TPO membranes) and the contact surface is primed (i.e. the upper surface of the adjoining membrane), the seam can achieve a peel strength, per PTR 10247 (ASTM D-413), of at least 35, in other embodiments at least 38, and in other embodiments at least 40 pounds per square inch (psi) at 72° C. Likewise, similar seams can achieve a peel strength, of at least 15, in other embodiments at least 17, and in other embodiments at least 20 pounds per square inch (psi) at 220° C. when the adjoining surface is primed. And, similar seams can achieve a peel strength, of at least 10, in other embodiments at least 11, and in other embodiments at least 12 pounds per square inch (psi) at 158° C. when the adjoining surface is primed.

As suggested above, practice of the present invention provides a lap seam, using the factory-applied pressure-sensitive adhesive described herein, as the sole adhesive, that advantageously outperforms seams prepared using the factory-applied pressure-sensitive adhesives of the prior art. For example, where the factory-applied pressure-sensitive adhesive is solely employed to seam thermoset rubber membranes (EPDM membranes), the seam can achieve a peel strength, per PSTC Standard 101 (2015), of at least 1.5, in other embodiments at least 1.6, and in other embodiments at least 1.7, in other embodiments at least 2.0, in other embodiments at least 2.3, in other embodiments at least 2.6, in other embodiments at least 3.0, and in other embodiments at least 3.5 pounds per lineal inch (pli) without the use of a primer. As a person of ordinary skill in the art will appreciate, the PSTC Standard 101 test is performed using an EPDM membrane sheet and adhering the sheet to a similar EPDM sheet as the substrate.

Also, where the factory-applied pressure-sensitive adhesive is solely employed to seam thermoset rubber membranes (EPDM membranes), the seam can achieve an adhesive shear strength, per PSTC Standard 107 (2015) at room temperature of at least 50 minutes, in other embodiments at least 60 minutes, in other embodiments at least 70 minutes, and in other embodiments at least 90 minutes.

Application to a Roof Surface

The membrane composites of the present invention can advantageously be applied to a roof surface (also known as roof substrate) by using standard peel-and-stick techniques. For example, the membrane can be unrolled on a roof surface and placed into position. Portions of the membrane are then typically folded back and portions of the release member are removed. The membrane can then subsequently be adhered to the roof surface by using various techniques including the use of rollers and the like to mate the adhesive to the substrate. Where multiple membrane panels are employed, the seams can be secured by using conventional techniques. It has advantageously been discovered that the pressure-sensitive adhesive layer employed in the membranes of the present invention allows the membranes to be adhered to a variety of roofing surfaces. These include, but are not limited to, wood decks, concrete decks, steel decks, faced construction boards, and existing membrane surfaces. In particular embodiments, the membranes of the present invention are adhered, through the cured adhesive layer disclosed herein, to a faced construction board such as, but not limited to, polyisocyanurate insulation boards or cover boards that include facers prepared from polar materials. For example, the adhesives of the present invention provide advantageous adhesion to facers that contain cellulosic materials and/or glass materials. It is believed that the polar nature of the adhesive is highly compatible with the polar nature of these facer materials and/or any adhesives or coatings that may be carried by glass or paper facers. Accordingly, embodiments of the present invention are directed toward a roof deck including a construction board having a cellulosic or glass facer and a membrane secured to the construction board through an at least partially cured polyacrylate adhesive layer in contact with a glass or cellulosic facer of the construction board.

According to aspects of the present invention, a lap seal is advantageously formed by overlapping a portion of adjacent membranes, removing the release member from the lap area portion to expose the pressure-sensitive adhesive, and then mating the pressure-sensitive adhesive to the upper surface of the overlapped, adjacent membrane. In one or more embodiments, the pressure-sensitive adhesive is mated to the adjacent membrane without any additional treatment to the adjacent membrane. For example, a technologically useful lap seam can be formed without the need for priming (either by field application or factory priming) the upper surface of the adjacent membrane that receives the pressure-sensitive adhesive. In other embodiments, the upper surface of the adjacent membrane is field primed. For example, EPDM membranes can be primed with commercially-available primers such as those available from Firestone Building Products, LLC under the tradenames Single Ply Primer, Quickprime Primer, and Low VOC Primer. In other embodiments, seams are prepared with the assistance of a lap sealant (e.g. a rubber-based sealant such as EPDM lap sealant). Useful lap sealants are known in the art as disclosed in U.S. Pat. No. 4,849,268, which is incorporated herein by reference. For example, a lap sealant is applied to the upper surface of a membrane in a location where the membrane is overlapped by an adjoining membrane where the membrane receives the pressure-sensitive adhesive. In other embodiments, a lap sealant is used in those locations where the thickness of the layer of pressure-sensitive adhesive may not fully fill any gaps within a seam. For example, a lap sealant is employment to complement the pressure-sensitive adhesive at a t-joint.

Various modifications and alterations that do not depart from the scope and spirit of this invention will become apparent to those skilled in the art. This invention is not to be duly limited to the illustrative embodiments set forth herein.

What is claimed is:

1. A method of preparing a flat or low-sloped roof, the method comprising:
   (i) providing a roof deck with a layer of construction board disposed thereon, where the layer of construction boards includes cellulosic or glass facer;
   (ii) providing first and second membrane composites, where each membrane composite includes a polymeric sheet having a roof-facing surface and an upward-facing surface and first and second lateral edges; said roof-facing surface having disposed thereon a layer of pressure-sensitive adhesive, where the layer of pressure-sensitive is disposed on the entirety of the roof-facing surface from the first lateral edge to the second lateral edge, the pressure-sensitive adhesive layer including a UV-cured polyacrylate having a gel content, as determined by THF extraction after boiling in THF after four hours, of at least 50% by weight, and where the polyacrylate, prior to UV curing, has a Tg of less than −20° C. and a number average molecular weight of from about 100 to about 350 kg/mol, and where the membrane composite further includes a release member disposed on the layer of pressure-sensitive adhesive;

(iii) removing the release member from the first membrane composite;

(iv) securing the first membrane composite to the layer of construction boards by mating the pressure-sensitive adhesive to the layer of construction boards;

(v) positioning the second membrane composite adjacent to the first membrane composite in a manner that the second membrane composite partially overlaps the first membrane composite to thereby form a lap portion;

(vi) removing the release member from the second membrane composite;

(vii) securing the second membrane composite to the layer of construction boards by mating the pressure-sensitive adhesive on the second membrane composite to the layer of construction boards;

(viii) applying a primer to the upward-facing surface of the first composite in the lap portion to thereby form a primed portion on the first membrane composite;

(ix) forming a seam between the first membrane composite and the second membrane composite by mating the pressure-sensitive adhesive of the second membrane composite to the primed portion of the first membrane composite, said seam including a seam edge formed by a lateral edge of the second membrane composite; and (x) applying a sealant along the seam edge.

2. The method of claim 1, where the pressure-sensitive adhesive layer including a UV-cured polyacrylate having a gel content, as determined by THF extraction after boiling in THF after four hours, of at least 60% by weight.

3. The method of claim 1, where the pressure-sensitive adhesive layer including a UV-cured polyacrylate having a gel content, as determined by THF extraction after boiling in THF after four hours, of from about 50% to about 90%.

4. The method of claim 1, where the pressure-sensitive adhesive layer including a UV-cured polyacrylate having a gel content, as determined by THF extraction after boiling in THF after four hours, of from about 60% to about 80%.

5. The method of claim 1, where the pressure-sensitive adhesive layer is characterized by a peel strength when adhered to the adjacent membrane, as determined by ASTM D-1876-08, of at least 3.6 lbf/in.

6. The method of claim 1, where the pressure-sensitive adhesive layer is characterized by a peel strength when adhered to the adjacent membrane, as determined by ASTM D-1876-08, of at least 8.0 lbf/in.

7. The method of claim 1, where the pressure-sensitive adhesive layer is characterized by a peel strength when adhered to the adjacent membrane, as determined by ASTM D-1876-08, of at least 15 lbf/in.

8. The method of claim 1, where the polymeric sheet is a thermoplastic membrane panel.

9. The method of claim 1, where the polymeric sheet is an EPDM membrane panel.

10. A method of installing a roof system, the method comprising:
(i) providing a first polymer membrane sheet secured to a roof surface, the first polymer membrane sheet including a upward-facing surface and a first lateral edge, the first polymer membrane sheet further including a layer of primer disposed on a portion of said upward-facing surface along said first lateral edge;
(ii) providing a membrane composite including a polymer membrane having an upward-facing surface and downward-facing surface, first and second lateral edges, a pressure-sensitive adhesive layer disposed on the downward-facing surface and extending from the first lateral edge to the second lateral edge, and a release member removably affixed to the pressure-sensitive adhesive layer, where said pressure-sensitive adhesive is a UV-cured polyacrylate having a gel content, as determined by THF extraction after boiling in THF after four hours, of from about 50% to about 90%, and where said UV-cured polyacrylate, prior to being cured, includes one or more units defined by the formula:

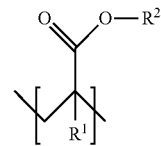

where each $R^1$ is individually hydrogen or a hydrocarbyl group and each $R^2$ is individually a hydrocarbyl group;
(iii) positioning the membrane composite adjacent to the first polymer membrane sheet secured to a roof surface, where said step of positioning places the membrane composite in an manner that overlaps the primer layer disposed on the first polymer membrane;
(iv) adhesively securing the membrane composite to the roof surface by mating a portion of the pressure-sensitive adhesive layer to the roof surface;
(v) adhesively securing the membrane composite to the first polymer membrane by mating a portion of the pressure-sensitive adhesive layer to the primed surface.

11. The method of claim 10, where each $R^1$ and $R^2$, respectively, throughout the polymer are the same in each unit.

12. The method of claim 10, where each $R^2$ is an alkyl group having at least 4 carbon atoms.

13. The method of claim 12, where each $R^1$ is hydrogen and each $R^2$, throughout the polymer, is an alkyl group having at least 4 carbon atoms.

14. A membrane composite comprising:
(i) a membrane panel having opposed first and second planar surfaces, said first planar surface including a roof-substrate contacting portion and a lap portion;
(ii) a pressure-sensitive adhesive layer disposed on said roof-substrate contacting portion and said lap portion, said pressure-sensitive adhesive layer including a UV-cured polyacrylate having a gel content, as determined by THF extraction after boiling in THF after four hours, of at least 50% by weight, and where the polyacrylate, prior to UV curing, has a Tg of less than −20° C. and a number average molecular weight of from about 100 to about 350 kg/mol; and (iii) a release member removably affixed to said pressure-sensitive adhesive layer in both said roof-substrate contacting portion and said lap portion, where said pressure-sensitive adhesive layer disposed on said roof-substrate portion and said lap portion is substantially homogeneous.

15. The membrane of claim 14, where said release member includes a perforation that allows said release member to be divided between said roof-substrate contacting portion and said lap portion.

16. The roof system of claim 14, where the degree of cure of said UV-cured adhesive varies by no more than 10% between said roof-substrate contacting portion and said lap portion.

17. The membrane of claim 14, where the degree of cure of said UV-cured adhesive varies by no more than 1% between said roof-substrate contacting portion and said lap portion.

18. The membrane of claim 14, where the UV-cured adhesive is a UV-cured polyacrylate, and where said UV-cured polyacrylate, prior to being cured, includes one or more units defined by the formula:

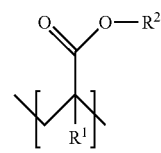

where each $R^1$ is individually hydrogen or a hydrocarbyl group and each $R^2$ is individually a hydrocarbyl group.

* * * * *